(12) United States Patent
Singh et al.

(10) Patent No.: US 7,523,615 B2
(45) Date of Patent: Apr. 28, 2009

(54) TELEMETRY SYSTEM

(75) Inventors: Anant Pal Singh, Cincinnati, OH (US); Terry Eugene Viel, Hamilton, OH (US); Malcolm John Ashby, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 649 days.

(21) Appl. No.: 11/093,640

(22) Filed: Mar. 30, 2005

(65) Prior Publication Data
US 2006/0218927 A1 Oct. 5, 2006

(51) Int. Cl.
*F02C 1/00* (2006.01)

(52) U.S. Cl. .................. 60/772; 340/870.07; 73/593; 324/207.25; 702/33; 384/448

(58) Field of Classification Search ............ 340/870.07, 340/682; 73/862.322, 593, 660; 324/207.19, 324/207.25, 207.62; 356/32–35.5; 702/33–36, 702/40–43, 182–185, 188, 56, 141, 113, 702/122, 179, 181; 384/448; 60/772
See application file for complete search history.

(56) References Cited

U.S. PATENT DOCUMENTS

| | | | |
|---|---|---|---|
| 3,677,072 A * | 7/1972 | Weichbrodt et al. ............ 73/593 |
| 4,203,319 A * | 5/1980 | Lechler .................. 73/862.541 |
| 4,225,851 A | 9/1980 | Reschovsky et al. |
| 4,341,122 A * | 7/1982 | Lechler et al. ......... 73/862.045 |
| 4,357,104 A | 11/1982 | Davinson |
| 4,464,935 A * | 8/1984 | McHugh ....................... 73/660 |
| 4,659,988 A | 4/1987 | Goff et al. |
| 4,941,105 A * | 7/1990 | Marangoni ................... 702/42 |
| 5,503,030 A * | 4/1996 | Bankestrom ........... 73/862.627 |
| 5,952,587 A * | 9/1999 | Rhodes et al. ......... 73/862.541 |
| 6,257,065 B1 * | 7/2001 | Kyrtsos ....................... 73/654 |
| 6,484,582 B2 * | 11/2002 | Ehrfeld et al. ................ 73/593 |
| 6,568,091 B1 | 5/2003 | Mercer et al. |
| 6,687,623 B2 * | 2/2004 | Bailey et al. .................. 702/42 |
| 6,766,697 B1 * | 7/2004 | Perez et al. ................... 73/800 |
| 7,034,711 B2 * | 4/2006 | Sakatani et al. .......... 340/686.1 |
| 7,140,228 B2 * | 11/2006 | Heim ........................ 73/12.13 |
| 7,241,053 B2 * | 7/2007 | Sato et al. .................... 384/448 |
| 7,389,701 B2 * | 6/2008 | Mol ....................... 73/862.322 |
| 2005/0169563 A1 * | 8/2005 | Inoue et al. ................. 384/448 |
| 2005/0259903 A1 * | 11/2005 | Takizawa et al. ............ 384/448 |
| 2006/0107765 A1 * | 5/2006 | Sentoku ................ 73/862.322 |
| 2006/0222278 A1 * | 10/2006 | Singh et al. ................. 384/448 |

FOREIGN PATENT DOCUMENTS

GB 2062875 A 5/1981
JP 02155893 A * 6/1990

* cited by examiner

*Primary Examiner*—William H Rodríguez
(74) *Attorney, Agent, or Firm*—William Scott Andes, Esq.; Armstrong Teasdale LLP (57) ABSTRACT

A method for predicting bearing failure of a differential bearing including an inner race, an outer race, and a plurality of rolling elements positioned between the inner and outer race, the method includes coupling a measuring apparatus comprising at least one of a strain gage and an accelerometer to the differential bearing, coupling a cable to the measuring apparatus, wherein the cable is adapted for passage through a rotating component, and coupling a transmitter to the cable, wherein the transmitter is configured to transmit a plurality of signals from the measuring apparatus to a remote location to facilitate predicting a failure of the differential bearing.

18 Claims, 7 Drawing Sheets

TELEMETRY SYSTEM

STATEMENT REGARDING FEDERALLY SPONSORED RESEARCH OR DEVELOPMENT

The U.S. Government may have certain rights in this invention pursuant to contract number NAS3-01135 Task Order 23.

BACKGROUND OF THE INVENTION

This application relates generally to gas turbine engines, and more particularly, to a bearing assembly used within a gas turbine engine and a method of monitoring same.

Gas turbine engines typically include a fan assembly, a core engine including a compressor, a combustor, and a first turbine, i.e. high-pressure turbine, and a second or low-pressure turbine that is coupled axially aft of the core gas turbine engine. The fan assembly and the low pressure turbine are coupled together using a first shaft, and the compressor and the high-pressure turbine are coupled together using a second shaft. At least one known gas turbine engine also include a differential bearing, i.e. inter-shaft bearing, that is coupled between the first and second shafts, respectively.

During operation, failure of a bearing assembly may result in an In Flight Shut Down (IFSD), and/or an Unscheduled Engine Removal (UER). Therefore, at least one known gas turbine engine includes a magnetic chip detection system that includes a magnet that attracts metallic debris that is created during bearing contact fatigue failures such as, but not limited to micro-spalling, peeling, skidding, indentations, and/or smearing. More specifically, magnetic chip detectors facilitate identifying the presence and quantity of metallic debris in a gas turbine lube oil scavenge line. In addition, a scanning electron microscope (SEM) may be used to determine the source of the metallic debris. However, known magnetic chip detection systems and SEM analysis systems can only detect a bearing spalling that has already occurred.

At least one known gas turbine engine also includes a vibration measurement system that transmits relatively high frequency acoustic emissions through the bearing to verify a bearing failure caused by bearing contact fatigue that has previously occurred. However, known vibration measurement systems may not be able to successfully identify the bearing failure if the transmitted signal is degraded when passed through a lubricant film that is used to lubricate the bearing. Therefore, identifying the bearing component frequencies among a plurality of engine operating frequencies may be relatively difficult. Accordingly, known systems are generally not effective in detecting initial bearing flaws and/or defects that may result in bearing spalling, in monitoring bearing damage and/or spall propagation, or in assessing the overall bearing damage including multi-spall initiations and progression.

BRIEF DESCRIPTION OF THE INVENTION

In one aspect, a method for predicting bearing failure of a differential bearing including an inner race, an outer race, and a plurality of rolling elements positioned between the inner and outer race is provided. The method includes coupling a measuring apparatus comprising at least one of a strain gage and an accelerometer to the differential bearing, coupling a cable to the measuring apparatus, wherein the cable is adapted for passage through a rotating component, and coupling a transmitter to the cable, wherein the transmitter is configured to transmit a plurality of signals from the measuring apparatus to a remote location to facilitate predicting a failure of the differential bearing.

In another aspect, a telemetry system that is configured to predict a bearing failure of a differential bearing including an inner race, an outer race, and a plurality of rolling elements positioned between the inner and outer race is provided. The telemetry system includes a measuring apparatus comprising at least one of a strain gage and an accelerometer coupled to the differential bearing, a cable connected at one end to the measuring apparatus adapted for passage through a rotating component, and a transmitter coupled to the cable and configured to transmit a plurality of signals from the measuring apparatus to a remote location to facilitate predicting a failure of the differential bearing.

In a further aspect, a gas turbine engine assembly is provided. The gas turbine engine assembly includes a core gas turbine engine including a first rotor shaft, a second rotor shaft, a differential bearing coupled between the first and second rotor shafts, the differential bearing comprising an inner race, an outer race, and a plurality of rolling elements positioned between the inner and outer race, a measuring apparatus comprising at least one of a strain gage and an accelerometer coupled to the differential bearing, and a telemetry system that is configured to predict a bearing failure of the differential bearing. The telemetry system includes a cable connected at one end to the measuring apparatus adapted for passage through a rotating component, and a transmitter coupled to the cable and configured to transmit a plurality of signals from the measuring apparatus to a remote location to facilitate predicting a failure of the differential bearing.

DETAILED DESCRIPTION OF THE INVENTION

Figure 1:
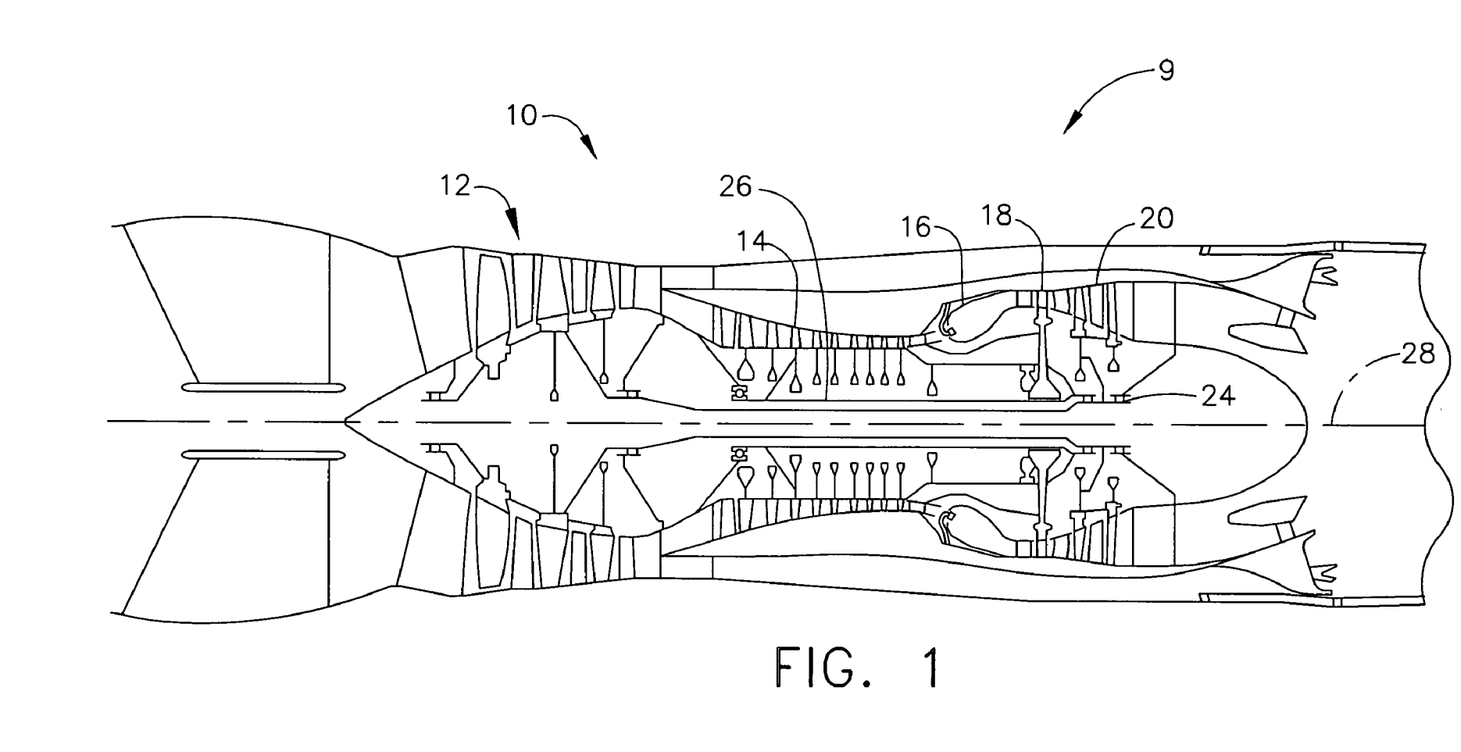
FIG. 1 is schematic illustration of an exemplary gas turbine engine assembly.

FIG. 1 is a schematic illustration of an exemplary gas turbine assembly 9 that includes a core gas turbine engine 10 including a fan assembly 12, a high pressure compressor 14, and a combustor 16. In the exemplary embodiment, gas turbine engine 10 is a military gas turbine engine that is available from General Electric Company, Cincinnati, Ohio. Gas turbine engine 10 also includes a high pressure turbine 18 and a low pressure turbine 20. Fan assembly 12 and turbine 20 are coupled by a first shaft 24, and compressor 14 and turbine 18 are coupled by a second shaft 26. First shaft 24 is coaxially positioned within second shaft 26 about a longitudinal centerline axis 28 of engine 10.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust system (not shown).

Figure 2:
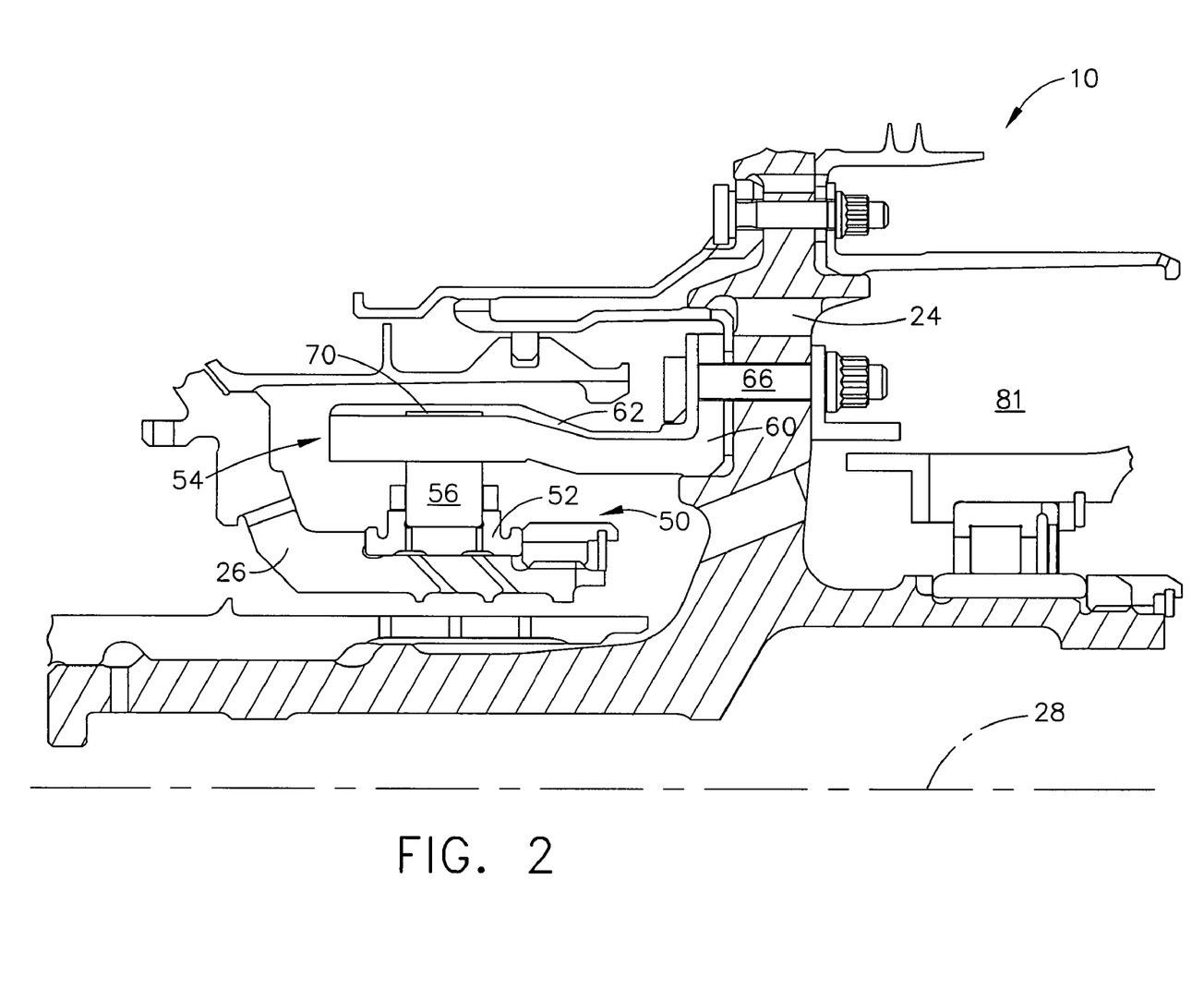
FIG. 2 is a cross-sectional view of an exemplary differential bearing assembly that may be used in the gas turbine engine shown in FIG. 1.

FIG. 2 is a cross-sectional view of an exemplary embodiment of a differential bearing assembly 50 that may be used with a gas turbine engine, such as engine 10 shown in FIG. 1. In the exemplary embodiment, differential bearing assembly 50 is coupled between first shaft 24 and second shaft 26. Although, the invention described herein is with respect to a single differential bearing 50, it should be realized that the invention described herein may also be utilized with a gas turbine engine that includes a plurality of differential bearings 50. Moreover, the invention described herein may also be utilized with a plurality of roller and/or ball bearing assemblies within gas turbine engine 10.

Differential bearing assembly 50 includes a rotating inner race 52 secured to shaft 26 that extends between high pressure turbine 18 and high pressure compressor 14. Differential bearing assembly 50 also includes a rotating outer race 54 that is secured to shaft 24 that extends between low pressure turbine 20 and fan assembly 12, and a plurality of bearings 56, i.e. rolling elements, that are positioned between inner and outer races 52 and 54 respectively. In the exemplary embodiment, bearings 56 are roller bearings. In an alternative embodiment, bearings 56 are ball bearings.

In the exemplary embodiment, (shown in FIG. 2) outer race 54 includes a first portion 60 that is substantially L-shaped, a second portion 62 that is substantially L-shaped, and at least one measuring device 70 that is coupled to first portion 60. In the exemplary embodiment, measuring device 70 is positioned between first and second portions 60 and 62. More specifically, measuring device 70 is coupled to first portion 60, and second portion 62 is coupled circumferentially around an exterior surface of both measuring device 70 and first portion 60 to facilitate protecting measuring device 70 from damage. In the exemplary embodiment, both first and second portions 60 and 62 are coupled to shaft 24 using a plurality of fasteners 66, and are therefore configured to rotate with shaft 24.

Figure 3:
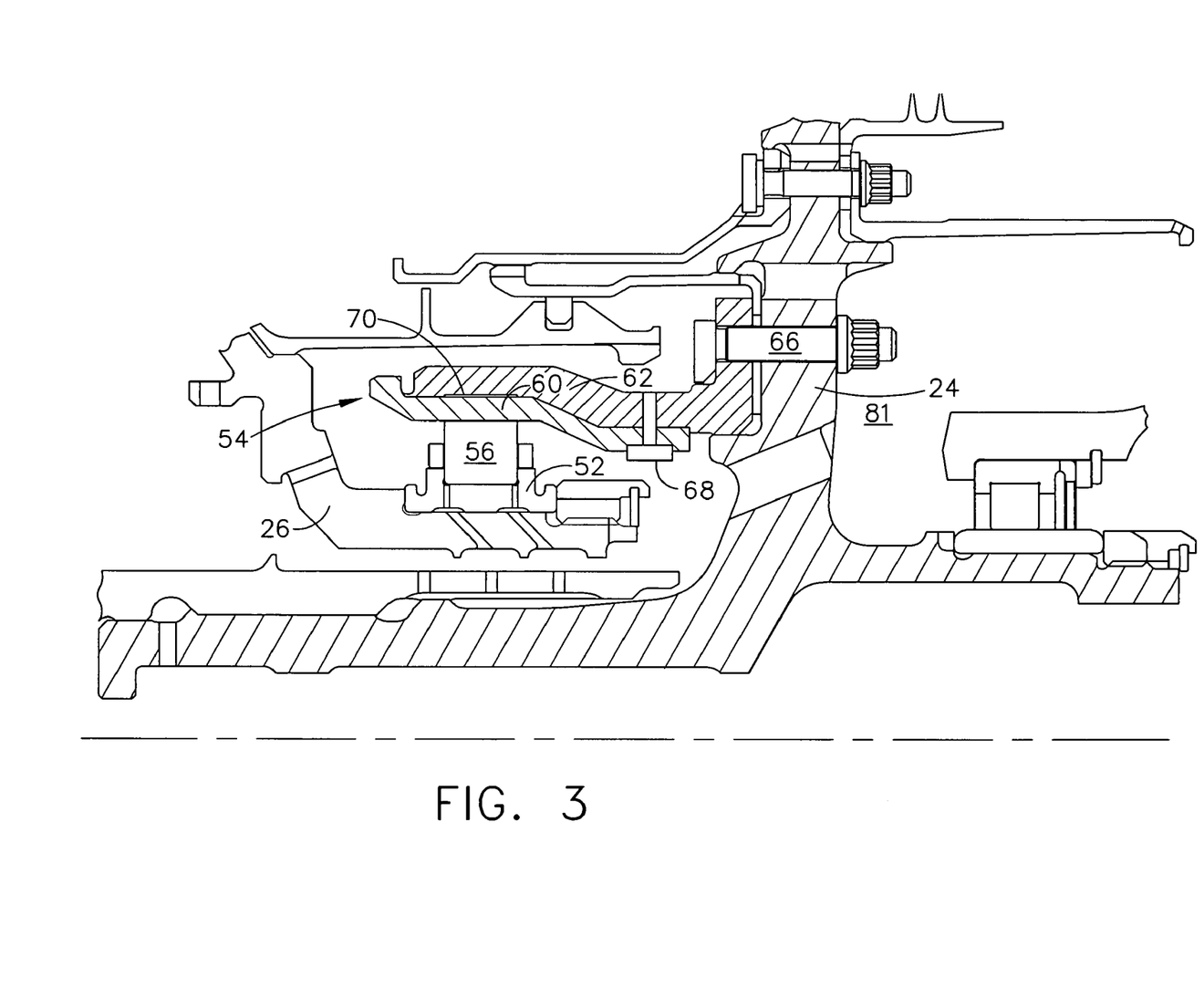
FIG. 3 is a cross-sectional view of an exemplary outer race that may be used with the differential bearing assembly shown in FIG. 2.

In another exemplary embodiment (shown in FIG. 3), outer race 54 includes first portion 60 and second portion 62 that is substantially L-shaped, and at least one measuring device 70 that is coupled to first portion 60. In the exemplary embodiment, measuring device 70 is positioned between first and second portions 60 and 62. More specifically, measuring device 70 is coupled to first portion 60 and second portion 62 is coupled radially around an exterior surface of both measuring device 70 and first portion 60 to facilitate protecting measuring device 70 from damage. In the exemplary embodiment, first portion 60 is coupled to second portion 62 using a plurality of fasteners 68, and second portion 62 is coupled to shaft 24 using a plurality of fasteners 66. Accordingly, and in the exemplary embodiment, first and second portions 60 and 62, and measuring device 70 are all configured to rotate with shaft 24.

Figure 4:
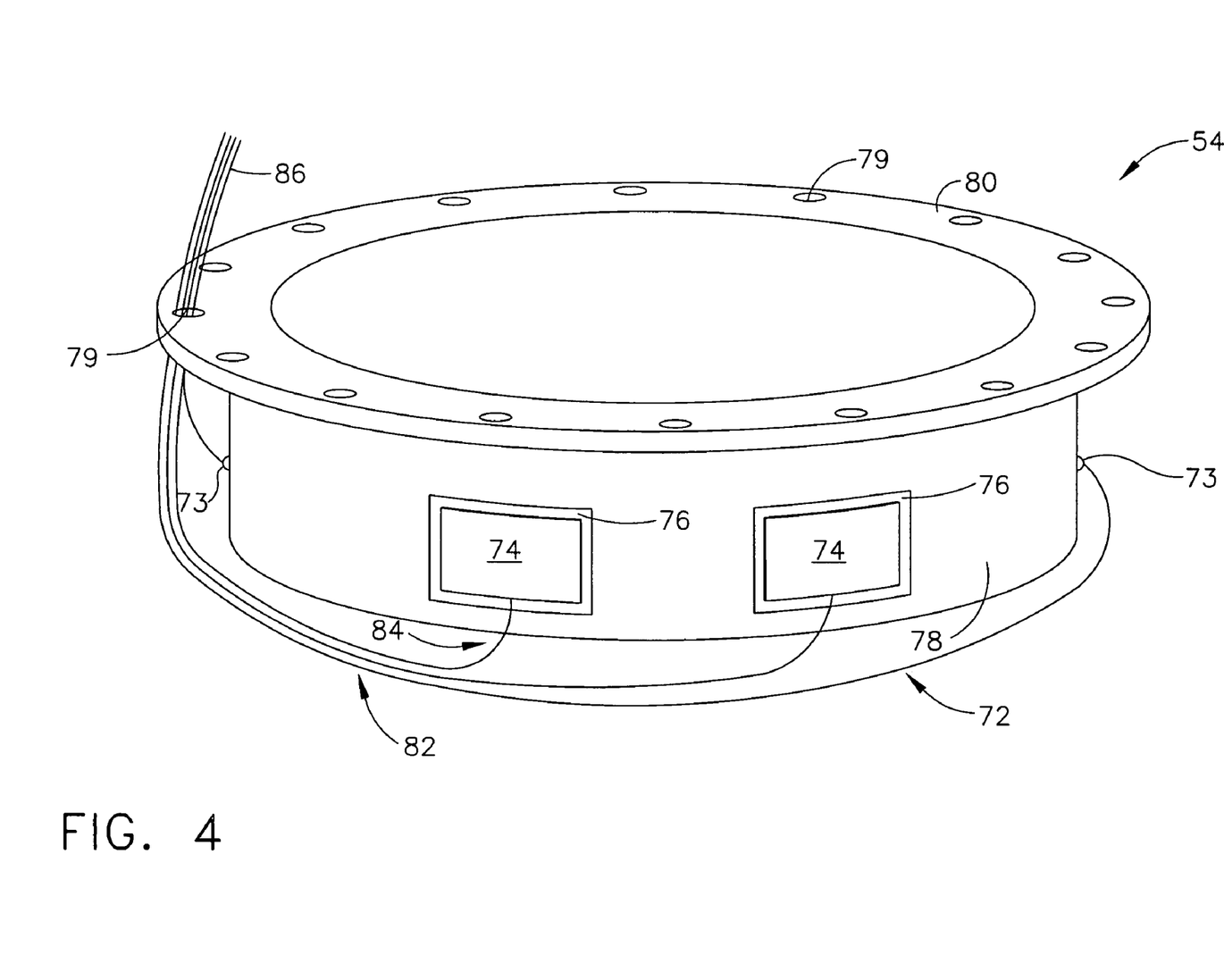
FIG. 4 is a perspective view of the outer race shown in FIG. 2.

FIG. 4 is a perspective view of outer race 54 (shown in FIGS. 2 and 3) that includes measuring device 70. Measuring device 70 is coupled to outer race 54 and is therefore configured to rotate with outer race 54. In one exemplary embodiment, measuring device 70 is a wire strain gage 72 that is configured to transmit a signal indicative of the reaction forces within bearing assembly 50 to an external monitoring system (not shown) for further analysis. Strain gage as used herein is defined as a resistive elastic unit whose change in resistance is a function of applied strain in accordance with Equation 1:

$$\frac{dR}{R} = S * \varepsilon \quad \text{(Equation 1)}$$

wherein S is the strain sensitivity factor of the gage material, R is the resistance, and $\varepsilon$ is the strain. In the exemplary embodiment, wire strain gage 72 includes at least one resistor 74, such as, but not limited to a metal foil, that is bonded to a respective elastic backing 76, which is then bonded to an exterior surface 78 of outer race 54. In use, the resistance of the wire, i.e. resistor 74, increases with increasing strain and decreases with decreasing strain as shown in Equation 2:

$$R = \rho \frac{l}{A} \quad \text{(Equation 2)}$$

wherein R is the total resistance, $\rho$ is resistivity, l is the length of the wire, and A is the cross-sectional area of the wire. Accordingly, the resistance change R is a combination effect of changes in length, cross-sectional area, and resistivity of wire 74. In an alternative embodiment, strain gage 72 is a semiconductor strain gage, for example. During operation, strain gage 72 is therefore configured to convert mechanical motion into an electronic signal, such that a change in capacitance, inductance, and/or resistance is proportional to the strain experienced by strain gage 72. For example, when wire 74 is held under tension, it gets slightly longer and its cross-sectional area is reduced. This changes its resistance (R) in proportion to the strain sensitivity (S) of wire 74 resistance. When a strain is introduced, the strain sensitivity, which is also called the gage factor therefore increases.

Strain gage 72 is suitably configured to measure a particular type of strain, or combinations of strains in more than one direction. For example, a strain gage that includes a single element foil is used to measure the strain of an element in a known direction, a double element foil is used to measure the strain in two known directions, a three element rosette is used to measure biaxial strain in unknown directions, a four element, full bridge element is used to measure tangential and radial strain, etc.

In the exemplary embodiment, strain gages 72 are coupled to outer race exterior surface 78 such that strain gage 72 is a surface mounted strain gage 72. In an alternative embodiment, strain gage 72 is embedded at least partially within outer race 54. In the exemplary embodiment, a single strain gage 72 is coupled to outer race 54 to facilitate predicting a failure of bearing assembly 50. In an alternative embodiment, a plurality of strain gages 72 are coupled to outer race 54 to facilitate predicting a failure of bearing assembly 50.

In the exemplary embodiment, measuring device 70 also includes at least one accelerometer 73 that is configured to transmit a signal indicative of acceleration and/or velocity of outer race 54. More specifically, accelerometer 73 monitors changes in acceleration, i.e. the rate of change of velocity with respect to time, of outer race 54, and communicates these changes to a bearing monitoring system.

Accelerometer 73 is suitably configured to measure acceleration and may include at least one of a piezo-film accelerometer, surface micro-machined capacitive (MEMS) accelerometer, a bulk micro-machined capacitive accelerometer, a piezo-electric accelerometer, a magnetic induction accelerometer, and/or an optical accelerometer, for example.

In the exemplary embodiment, accelerometer 73 is coupled to outer race exterior surface 78 and extends at least partially through outer race 54 such that accelerometer 73 rotates with outer race 54. In one embodiment, bearing assembly 50 includes at least one accelerometer 73. In the exemplary embodiment, bearing assembly 50 includes two accelerometers 73. In an alternative embodiment, bearing assembly 50 includes more than two accelerometers 73 that are each coupled to outer race 54 and therefore configured to rotate with outer race 54.

Outer race 54 also includes a mounting flange 80 that is configured to couple outer race 54 to gas turbine engine 10. Specifically, mounting flange 80 includes a plurality of openings 79 that are sized to receive a fastener 66 to facilitate coupling outer race 54 to shaft 24. In the exemplary embodiment, outer race 54 and flange 80 are formed together unitarily.

Figure 6:
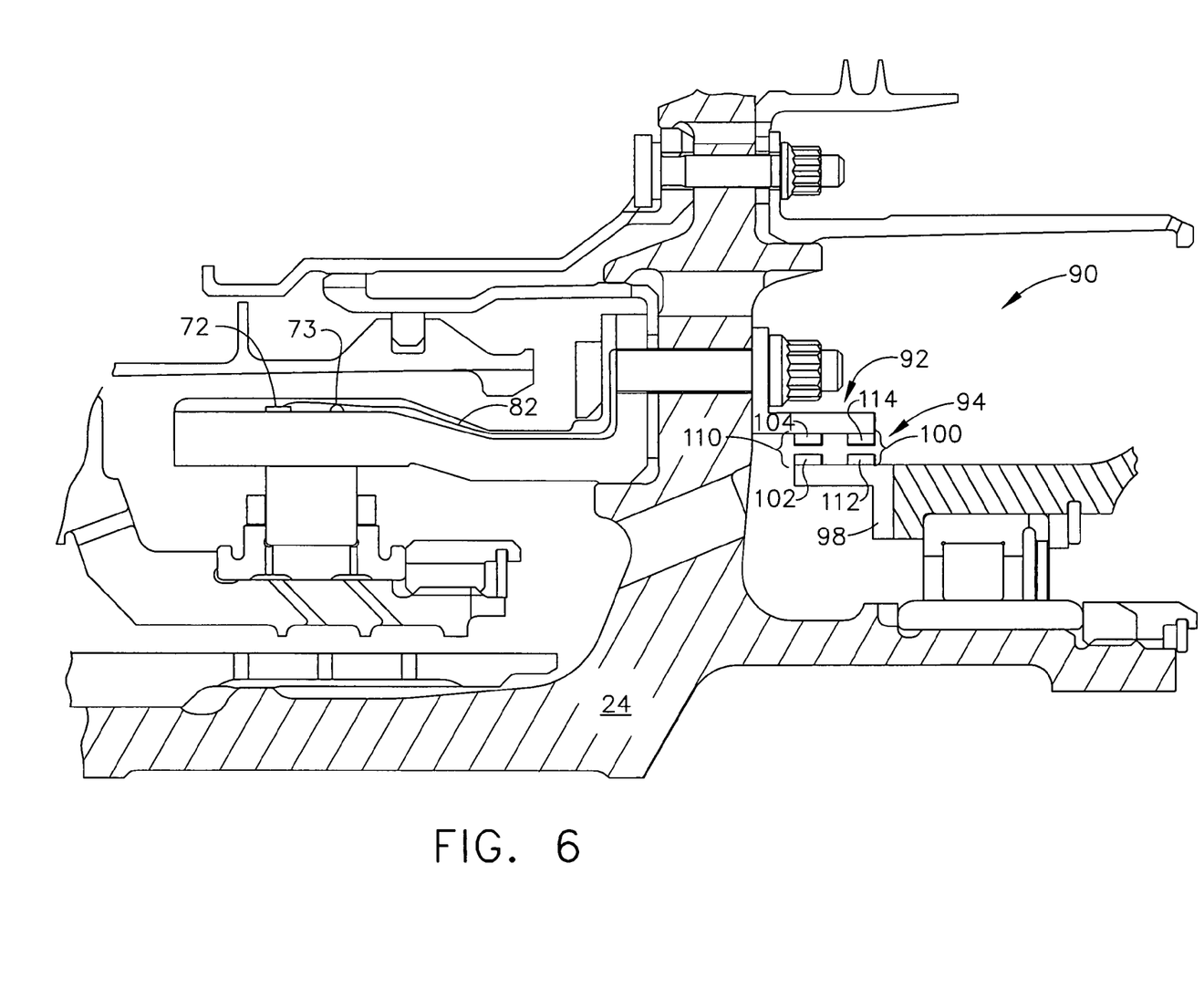
FIG. 6 is cross-sectional view of a portion of the exemplary gas turbine shown in FIG. 1 that includes the exemplary telemetry system in a second operational configuration.
Figure 7:
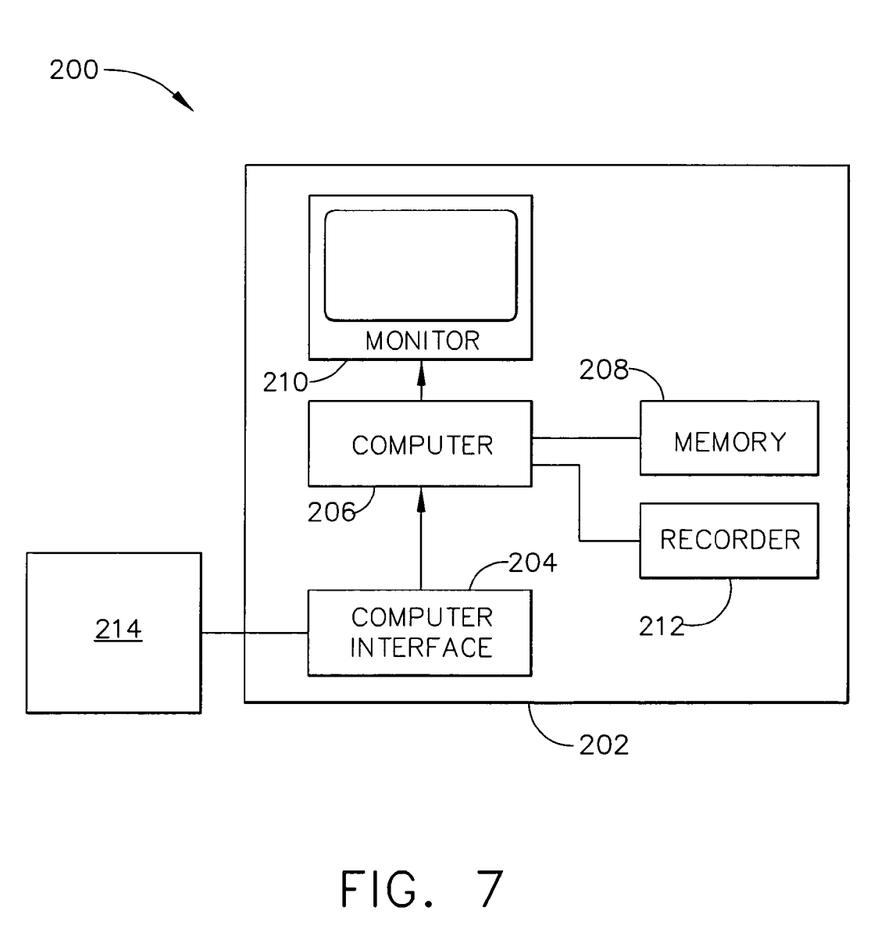
FIG. 7 is a bearing monitoring system that may be used to monitor the differential bearing assemblies shown in FIGS. 2 and 3.

Bearing assembly 50 also includes a wiring harness 82 to facilitate electrically coupling strain gages 72 and/or accelerometers 73 to a bearing monitoring system such as bearing monitoring system 200 (shown in FIG. 7). Wiring harness 82 is coupled to a transmitter (shown in FIGS. 5 and 6) that is configured to transmit a signal such as, but not limited to, an RF signal, to bearing monitoring system 200. During assembly, a wiring harness first end 84 is coupled to each respective strain gage 72 and accelerometer 73, and a wiring harness second end 86 is channeled through at least one opening 79 and into a bearing cavity 81 to facilitate transmitting a signal such as, but not limited to, an RF signal, from each respective strain gage 72 and/or accelerometer 73 to a remote bearing monitoring system 200.

Figure 5:
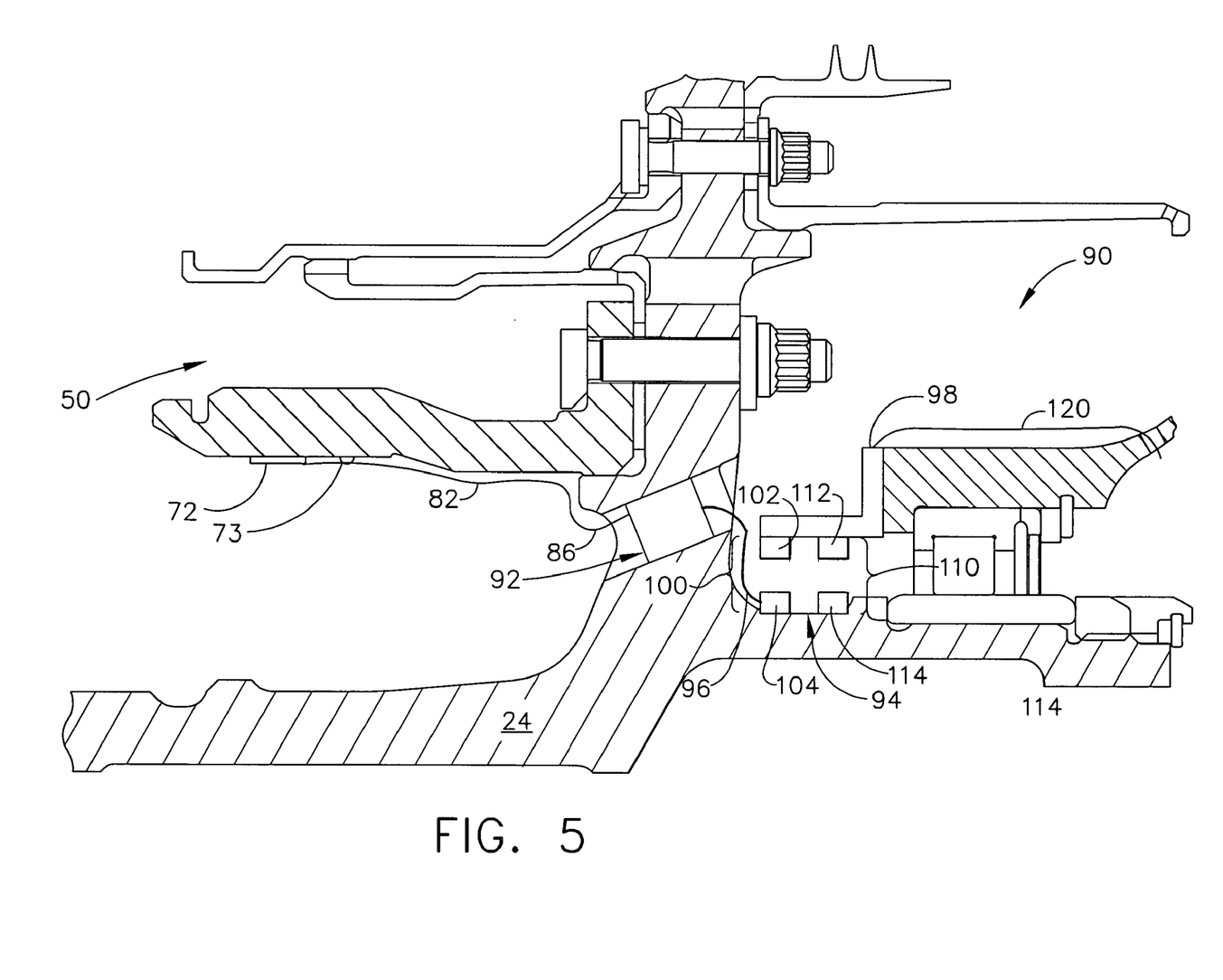
FIG. 5 is cross-sectional view of a portion of the exemplary gas turbine shown in FIG. 1 that includes an exemplary telemetry system in a first operational configuration.

In the exemplary embodiment, gas turbine assembly 9 also includes a telemetry system 90. As used herein the term telemetry system is defined as an electrical apparatus for measuring a quantity such as pressure, speed, acceleration and/or temperature, for example of bearing assembly 50, and transmitting the result to a distant location. In the exemplary embodiment, as shown in FIG. 5, telemetry system 90 includes a rotating transmitter 92 that is electrically coupled to at least one of strain gages 72 and/or accelerometers 73 via wiring harness 82. In the exemplary embodiment, transmitter 92 is configured to transmit an RF signal, for example, to a rotating telemetry module 94. Telemetry module 94 is therefore configured to rotate with bearing assembly 50. In the exemplary embodiment, telemetry module 94 is configured to supply power to transmitter 92 via a wiring harness 96, to transmit power to strain gages 72 and/or accelerometers 73 via wiring harness 82, and to transmit a signal received from transmitter 92 to a stationary antenna 98.

Accordingly, and in the exemplary embodiment, telemetry system 90 includes a first pair of induction power coils 100 that include a stationary coil 102 and a rotating coil 104 that is coupled radially inwardly of stationary coil 102 that facilitate generating power for transmitter 92, and telemetry module 94, and thus facilitates the real-time collection of data from bearing assembly 50. Telemetry system 90 also includes a second pair of induction coils 110 that include a stationary coil 112 and a rotating coil 114 that is coupled radially inwardly of stationary coil 112 that are configured to facilitate transmitting data collected from bearing assembly 50 to a remote system such as bearing monitoring system 200. In the exemplary embodiment, coils 104 and 114 are coupled to a rotating component such as shaft 24 for example, and stationary coils 102 and 112 are coupled to a stationary component such as a turbine frame, for example. In the exemplary embodiment, pairs of coils 100 and 110 are substantially cylindrical and extend around an outer periphery of shaft 24. More specifically, data is transmitted from transmitter 92 to telemetry module 94. The information is then transmitted to rotating coil 112 such that a corresponding electrical signal is induced in stationary coil 114. The signal is then transmitted to bearing monitoring system 200 via antenna 98, or alternatively is transmitted to bearing monitoring system 200 through an antenna 120 that is channeled through the turbine rear frame.

FIG. 6 is a cross-sectional view of telemetry system 90 in a second operational configuration. In the exemplary embodiment, as shown in FIG. 6, telemetry system 90 includes rotating transmitter 92 that is electrically coupled to at least one of strain gages 72 and/or accelerometers 73 via wiring harness 82. In the exemplary embodiment, transmitter 92 is configured to transmit an RF signal, for example, to a rotating telemetry module 94 that is formed integrally with transmitter 92 is a substantially L-shaped unit that is configured to rotate with bearing assembly 50. In the exemplary embodiment, telemetry module 94 is coupled to transmitter 92 and is configured to supply power to transmitter 92 and to transmit a signal received from transmitter 92 to stationary antenna 98. More specifically, telemetry system 90 includes first pair of induction power coils 100 that include a stationary coil 102 and a rotating coil 104 that is coupled radially outwardly of stationary coil 102 that facilitate generating power for transmitter 92, and telemetry module 94, and thus facilitates the real-time collection of data from bearing assembly 50. Telemetry system 90 also includes second pair of induction coils 110 that include stationary coil 112 and rotating coil 114 coupled radially outwardly of stationary coil 112 that are configured to facilitate transmitting data collected from bearing assembly 50 to a remote system such as bearing monitoring system 200. In the exemplary embodiment, rotating coils 104 and 114 are coupled to a rotating component such as shaft 24 for example, and stationary coils 102 and 112 are coupled to a stationary component such as a turbine frame for example. In the exemplary embodiment, pairs of coils 100 and 110 are substantially cylindrical and extend around an outer periphery of shaft 24. More specifically, data is transmitted from transmitter 92 to telemetry module 94. The information is then transmitted to rotating coil 114 such that a corresponding electrical signal is induced in stationary coil 112. The signal is then transmitted to bearing monitoring system 200 via antenna 98.

FIG. 7 is a bearing monitoring system 200 that may be used to monitor a gas turbine engine bearing such as, but not limited to, bearing assembly 50 (shown in FIG. 2). In the exemplary embodiment, bearing monitoring system 200 is coupled to core gas turbine engine 10 and includes a data acquisition/control system 202 that is coupled to bearing assembly 50 such that data collected from bearing assembly 50 can be transmitted to/from data acquisition/control system 202. Data acquisition/control system 202 includes a computer interface 204, a computer 206, such as a personal computer, a memory 208, a monitor 210, and an antenna 211. Computer 206 executes instructions stored in firmware (not shown). Computer 206 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

Memory 208 is intended to represent one or more volatile and/or nonvolatile storage facilities not shown separately that are familiar to those skilled in the art. Examples of such storage facilities often used with computer 206 include solid state memory (e.g., random access memory (RAM), read-only memory (ROM), and flash memory), magnetic storage devices (e.g., floppy disks and hard disks), optical storage devices (e.g., CD-ROM, CD-RW, and DVD), and so forth. Memory 208 may be internal to or external to computer 206. In the exemplary embodiment, data acquisition/control system 202 also includes a recording device 212 such as, but not limited to, a strip chart recorder, a C-scan, and an electronic recorder, electrically coupled to at least one of computer 206 and bearing assembly 50.

Accordingly, strain gages 72, accelerometers 73, telemetry system 90, and bearing monitoring system 200 facilitate predicting a bearing failure. More specifically, data is continuously transmitted from bearing assembly 50 to an antenna 214 that is coupled to bearing monitoring system 200 utilizing telemetry system 90. The data is then analyzed utilizing an algorithm installed on computer 206 to evaluate the current operational state of bearing assembly 50. In the exemplary embodiment, the data is compared to known data, i.e. a bearing performance model, to estimate a future date in which bearing assembly 50 may possibly fail. Accordingly, bearing assembly 50 can be repaired or replaced prior to an In Flight Shut Down (IFSD) to facilitate avoiding an Unscheduled Engine Removal (UER).

The telemetry system described herein can be utilized to facilitate predicting damage to a differential bearing before significant damage occurs. Specifically, a strain gage and/or an accelerometer are coupled to the bearing assembly to facilitate determining current damage to the differential bearing. Signals generated by the strain gages and the accelerometers are then transmitted to a remote location for further analysis utilizing the telemetry system.

More specifically, the telemetry system described herein is built-in to a differential bearing sump and utilizes the available sump lube supply to facilitate maintaining the desired thermal balance. In the exemplary embodiment, the telemetry system includes a stationary ring and a rotating ring that are configured to generate electrical power to various components utilized by the telemetry system and to also transmit a signal from the installed instrumentation to a remote location. Moreover, the inner or outer ring can be configured to rotate depending on the specific required design application and gas turbine engine sump configuration, such as for example, available space within the sump, lubrication distribution, and/or the ease of assembly and disassembly of the telemetry system within the gas turbine engine. In the exemplary embodiment, the rotating portion of the telemetry system is mounted on the #5R bearing journal within the gas turbine engine, and has the rotating transmitters secured within the air holes, and the stationary portion of the telemetry system is integrated within the #5R housing. Alternatively, the rotating portion of the telemetry system is flange mounted on the aft side of the LP rotor by the same nuts and bolts that hold the outer race flange, and the outer differential seal on the forward side. The rotating lead wires connecting the sensors and the transmitter are then secured within the axial space of the bolthole to facilitate protecting the telemetry system against the G loading. In the exemplary embodiment, the built-in rotating transmitter provides excitation to the sensors, and transmits sensor signals to a remote location. Additionally, the stationary portion of the telemetry is integrated with the stationary housing of the #5R bearing. The rotating telemetry system described herein is configured to generate power, and additionally to relay the sensor signals to a remote location. The engine lube oil supply system is also used to facilitate cooling the telemetry electronics. Specifically, the continuous oil flow within the radial gap between the stationary and rotating portions of the telemetry system facilitates maintaining the desired thermal balance to safeguard the long-term survival of the telemetry system. The power to the transmitters is maintained either through recharging action or engine power. Finally the sensor signals picked up by the stationary antenna are processed through data analysis/reduction algorithms for the purpose of bearing diagnostics, and prognostics.

The functioning of the proposed telemetry system would provide a simplified but an improved reliable system that is built within the sump. The thermal balance to maintain survivability is accomplished through the already available sump lube supply. The integration of the rotating and stationary telemetry portions with the mating sump hardware resolves the issues related to the minimal space available within in any differential sump. The reduced number of parts will make the system robust and reliable. This approach will provide an online monitoring system for production engines covering military, commercial, and industrial applications.

The above-described telemetry system is cost-effective and highly reliable. The telemetry system is configured to predict a bearing failure of a differential bearing including an inner race, an outer race, and a plurality of rolling elements positioned between the inner and outer race. The telemetry system includes a measuring apparatus including at least one of a strain gage and an accelerometer coupled to the differential bearing, a cable connected at one end to the measuring apparatus adapted for passage through a rotating component, and a transmitter coupled to the cable and configured to transmit a plurality of signals from the measuring apparatus to a remote location to facilitate predicting a failure of the differential bearing.

Exemplary embodiments of a telemetry system are described above in detail. The telemetry system is not limited to the specific embodiments described herein, but rather, components of the telemetry system may be utilized independently and separately from other components described herein. Specifically, the components of the telemetry system may be installed on a wide variety of engines to facilitate predicting a bearing failure within these engines.

While the invention has been described in terms of various specific embodiments, those skilled in the art will recognize that the invention can be practiced with modification within the spirit and scope of the claims.

What is claimed is:

1. A method for predicting bearing failure of a differential bearing including an inner race, an outer race, and a plurality of rolling elements positioned between the inner and outer race, said method comprising:
   coupling the differential bearing between a first turbine shaft and a second turbine shaft;
   coupling a measuring apparatus comprising at least one of a strain gage and an accelerometer to the differential bearing;
   coupling a cable to the measuring apparatus, wherein the cable is adapted for passage through a rotating component; and
   coupling a transmitter to the cable, wherein the transmitter is configured to transmit a plurality of signals from the measuring apparatus to a remote location to facilitate predicting a failure of the differential bearing.

2. A method in accordance with claim 1 further comprising coupling the transmitter to a telemetry module, wherein the telemetry module is configured to supply power to the transmitter and to the measuring apparatus.

3. A method in accordance with claim 2 wherein the telemetry module includes a first pair of coils and a second pair of coils, said method further comprising:
   generating power utilizing the first pair of coils;
   channeling the power to the telemetry module and the measuring apparatus; and
   transmitting the plurality of signals from the telemetry module to a first antenna that is fixedly coupled to a stationary surface of a gas turbine engine utilizing the second pair of coils.

4. A method in accordance with claim 3 wherein the first and second pairs of coils each include a stationary coil and a rotating coil, said method further comprising:
   generating power utilizing the first pair of coils;
   channeling the power to the telemetry module and the measuring apparatus; and
   transmitting the plurality of signals from the telemetry module to a first antenna that is fixedly coupled to a stationary surface of a gas turbine engine utilizing the second pair of coils.

5. A method in accordance with claim 3 further comprising coupling the telemetry module to a gas turbine engine such that the telemetry module is configured to rotate with the differential bearing.

6. A method in accordance with claim 3 further comprising transmitting signals from the first antenna to a second antenna that is positioned remotely from a gas turbine engine, wherein the second antenna is operationally coupled to a bearing monitoring system that is configured to receive the signals from the second antenna, and utilize the received signals to facilitate predicting a failure of the differential bearing.

7. A telemetry system that is configured to predict a bearing failure of a differential bearing including an inner race, an outer race, and a plurality of rolling elements positioned between the inner and outer race, said telemetry system comprises:
   a measuring apparatus comprising at least one of a strain gage and an accelerometer coupled to said differential bearing;
   a cable connected at one end to said measuring apparatus adapted for passage through a rotating component; and
   a transmitter coupled to said cable and configured to transmit a plurality of signals from said measuring apparatus to a remote location to facilitate predicting a failure of the differential bearing;
   wherein said differential bearing is coupled between a first turbine shaft and a second turbine shaft.

8. A telemetry system in accordance with claim 7 wherein said transmitter is electrically coupled to a telemetry module, said telemetry module is configured to supply power to said transmitter and to said measuring apparatus.

9. A telemetry system in accordance wit claim 8 further comprising:
   a first pair of coils configured to generate power utilized by said telemetry module and said measuring apparatus; and
   a second pair of coils configured to transmit said plurality of signals from said telemetry module to a first antenna that is fixedly coupled to a stationary surface of a gas turbine engine.

10. A telemetry system in accordance with claim 9 wherein said first and second pairs of coils each comprise a stationary coil and a rotating coil.

11. A telemetry system in accordance with claim 9 wherein said telemetry module is configured to rotate with said differential bearing.

12. A telemetry system in accordance with claim 9 wherein said first antenna is configured to transmit signals to a second antenna that is positioned remotely from the gas turbine engine, said second antenna operation coupled to a bearing monitoring system that is configured to receive the signals from the second antenna, and utilize the received signals to facilitate predicting a failure of said differential bearing.

13. A gas turbine engine assembly comprising:
   a core gas turbine engine comprising:
      a first rotor shaft;
      a second rotor shaft;
      a differential bearing coupled between said first and second rotor shafts, said differential bearing comprising an inner race, an outer race, and a plurality of rolling elements positioned between the inner and outer race;
      a measuring apparatus comprising at least one of a strain gage and an accelerometer coupled to said differential bearing; and
      a telemetry system that is configured to predict a bearing failure of said differential bearing, said telemetry system comprising:
         a cable connected at one end to said measuring apparatus adapted for passage through a rotating component; and
         a transmitter coupled to said cable and configured to transmit a plurality of signals from said measuring apparatus to a remote location to facilitate predicting a failure of the differential bearing.

14. A gas turbine engine assembly in accordance with claim 13 wherein said transmitter is electrically coupled to a telemetry module, said telemetry module is configured to supply power to said transmitter and to said measuring apparatus.

15. A gas turbine engine assembly in accordance with claim 14 further comprising:
   a first pair of coils configured to generate power utilized by said telemetry module and said measuring apparatus; and
   a second pair of coils configured to transmit said plurality of signals from said telemetry module to a first antenna that is fixedly coupled to a stationary surface of said gas turbine engine.

16. A gas turbine engine assembly in accordance with claim 15 wherein said first and second pairs of coils each comprise a stationary coil and a rotating coil.

17. A gas turbine engine assembly in accordance with claim 15 wherein said telemetry module is configured to rotate with said differential bearing.

18. A gas turbine engine assembly in accordance with claim 15 wherein said first antenna is configured to transmit signals to a second antenna that is positioned remotely from the gas turbine engine, said second antenna operation coupled to a bearing monitoring system that is configured to receive the signals from the second antenna, and utilize the received signals to facilitate predicting a failure of said differential bearing.

* * * * *